April 11, 1967   R. SCHMIDT ETAL   3,313,128
KNITTING MACHINE WITH SYNCHRONIZED PATTERN CONTROL
Original Filed Oct. 15, 1964
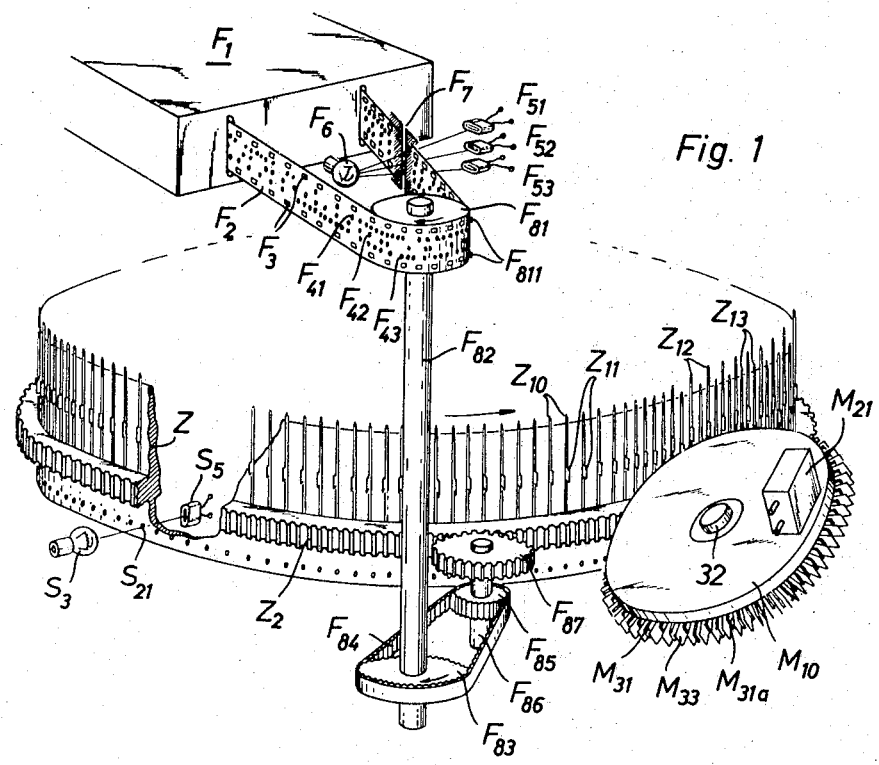
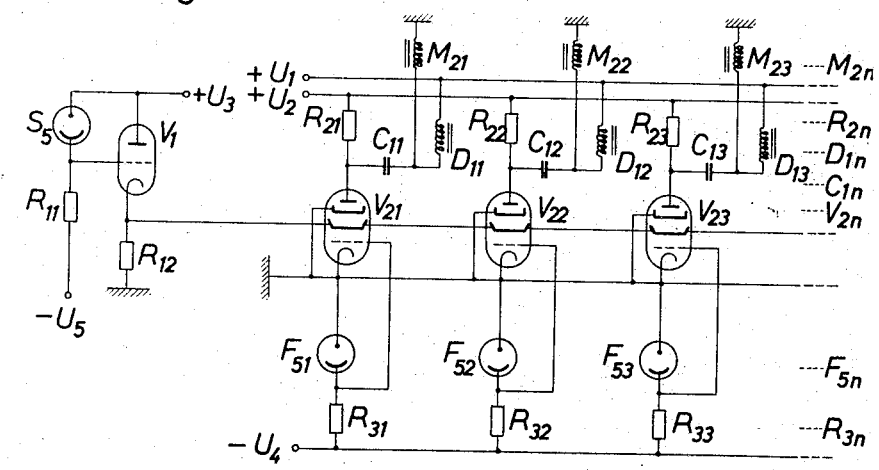
INVENTORS
Richard Schmidt
Hans Joachim Flock
BY
Michael S. Striker
ATTORNEY April 11, 1967 R. SCHMIDT ETAL 3,313,128
KNITTING MACHINE WITH SYNCHRONIZED PATTERN CONTROL
Original Filed Oct. 15, 1964

INVENTORS
Richard Schmidt
Hans Joachim Stich
BY
Michael S. Striker
ATTORNEY

April 11, 1967  R. SCHMIDT ET AL  3,313,128
KNITTING MACHINE WITH SYNCHRONIZED PATTERN CONTROL
Original Filed Oct. 15, 1964  5 Sheets-Sheet 3
Fig. 4
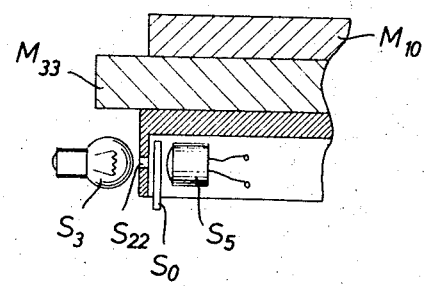
Fig. 5
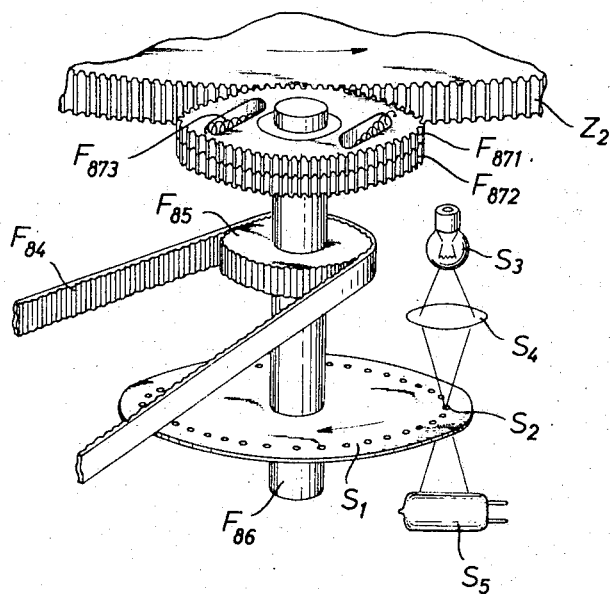
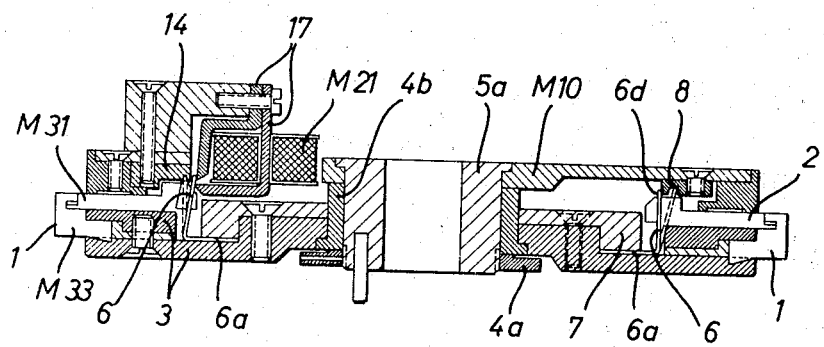
FIG. 7a
INVENTORS
Richard Schmidt
Hans *illegible*
BY
*illegible signature*
ATTORNEY

United States Patent Office 3,313,128
Patented Apr. 11, 1967

3,313,128
KNITTING MACHINE WITH SYNCHRONIZED PATTERN CONTROL
Richard Schmidt, Stuttgart-Vaihingen, and Hans Joachim Stock, Freiberg, im Breisgau, Germany, assignors to Franz Morat G.m.b.H., Stuttgart-Vaihingen, Germany
Continuation of application Ser. No. 404,118, Oct. 15, 1964. This application June 29, 1966, Ser. No. 562,938
Claims priority, application Germany, Oct. 21, 1963, M 58,620
20 Claims. (Cl. 66—50)

This application is a continuation of copending application Ser. No. 404,118, filed Oct. 15, 1964, which is now abandoned.

The present invention relates to a knitting machine with synchronized pattern control, and more particularly to a circular knitting machine provided with pattern wheels at a plurality of knitting stations which incorporate jacks controlled by electromagnetic means. The electromagnetic means actuate the jacks in accordance with a program represented by a program tape.

An arrangement of this type is described in the copending application Ser. No. 17,888 filed by J. Stock on March 28, 1960. This application discloses an arrangement in which phase displacements between the program controlled command station and the controlled parts of the machine are compensated by correction of the electric control impulses produced by the command station.

The time correction is obtained by superimposing comparatively long command pulses produced by sensing of the program carrier, with substantially shorter control pulses produced by an impulse generator which is coupled with the machine or device to be controlled for operation in rigid synchronism. Each control impulse is produced when one or several operations are to be performed, but is transmitted to the controlled device only when superimposed with a command impulse. In this manner, the control impulses assure rigid synchronization, but the operations are still carried out in accordance with the command impulses produced by the program control means. Due to the greater length of the command impulses, accurate synchronized commands are transmitted even if the command impulses are displaced relative to the precisely timed control impulses.

It is one object of the invention to improve this arrangement, and to provide a knitting machine with an accurately synchronized pattern control arrangement.

Another object of the invention is to produce synchronizing control impulses by photoelectric means.

Another object of the invention is to control pattering operations in a knitting machine by sensing the position of the needle cylinder, of one or several pattern wheels, or of another element rotating in rigid synchronism with the pattern wheels and the knitting cylinder of the circular knitting machine.

Another object of the invention is to actuate electric operating means of the pattern producing jacks by an electronic circuit controlled by synchronizing impulses derived from a rotary element of the machine.

With these objects in view, the present invention relates to a knitting machine, preferably a circular knitting machine which is adapted to knit in accordance with a pattern controlled by a pattern controlling element. One embodiment of the invention comprises a movable machine element driven to cause knitting operations, for example the needle cylinder of a circlular knitting machine; a pattern controlling element, such as a set of pattern wheels having individually operable jacks, and electric operating means operable for individually actuating the jacks; program controlled means connected with the electric operating means for causing selective actuation of the jacks; impulse generator means controlled either by the needle cylinder or by the pattern wheels to produce electrical impulses at a frequency proportionate to the speed of the same; and electric synchronizing means controlled by the impulses of the impulse generator means and controlling the electric actuating means to render the same operative for predetermined short time periods.

Each pattern wheel, or other pattern controlling element, is connected with the knitting machine for synchronous movement, but the rigid synchronism of the movement of the jacks with the position of the knitting machine, for example with the needle cylinder is assured by the fact that the impulses produced by the impulse generator means very precisely control the actuating means of the jacks through synchronizing means which are preferably electronic circuits which are not subject to delays caused by the engagement of mechanical parts.

The impulse generator according to the invention includes a rotary perforated member driven either by the needle cylinder or by a pattern wheel, a source of light, and a photocell receiving light impulses through the openings of the perforated member to produce synchronizing impulses. However, the needles of the needle cylinder, or channels receiving the needles for sliding movement, or projecting portions between the channels, may also be sensed by a beam of light controlling a photocell or other light responsive means which produces an impulse whenever the amount of light impinging thereon varies. The impulses produced by the photocell of the impulse generator are supplied to the control grid of a triode which is electrically connected with the control grid of a pentode controlling the electromagnetic operating means by which the jacks of the pattern wheels are controlled. Since the synchronizing impulses of the impulse generator are very short as compared with the time periods between jack actuations, while the command impulses produced by the photocell of the program controlled means are about as long as this time period, a relative time lag between the command impulses and the synchronizing impulses of about half the length of the time period between two jack actuations is permissible, assuming a corresponding timing of the creation of the synchronizing impulses so that the synchronizing impulses are produced in the middle of the available time period. Therefore, the program carrier can be displaced for half the time period between two operations of the needles without any disturbance of the needle operations.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating schematically one embodiment of the invention provided with photo-electric sensing means cooperating with the needle cylinder of a circular knitting machine;

FIG. 2 is a diagrammatic view illustrating an electronic circuit used in the embodiment of FIG. 1, but being applicable to other embodiments of the invention;

FIG. 4 is a fragmentary axial sectional view illustrating a portion of a pattern wheel provided with photo-electric sensing means in accordance with a third embodiment of the invention;

FIG. 5 is a fragmentary perspective view illustrating a fourth embodiment of the photo-electric sensing means by which the synchronizing impulses are produced;

FIG. 7a is an axial sectional view of a pattern wheel used in a circular knitting machine to which the present invention is applied; and FIG. 7b is a plan view of the pattern wheel of FIG. 7a.

Figure 3:
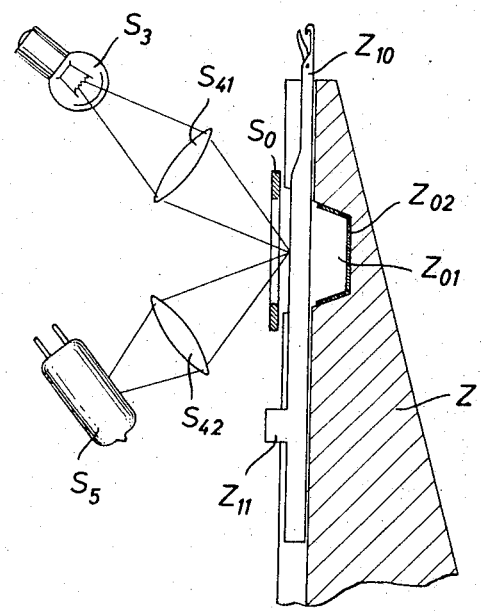
FIG. 3 is a fragmentary axial sectional view.

Referring now to the drawings, and more particularly to FIG. 1, a needle cylinder Z is rotated about a vertical axis by a drive pinion, not shown, meshing with a ring gear Z2. A pinion F87 meshes with ring gear Z2 and drives through a shaft F86 which is part of a transmission including another gear F83 and a gear belt F84. Gear F83 is connected by a shaft F82 to a sprocket wheel F81 whose teeth F811 engage perforations F3 on both sides of a program tape F2 which passes over suitable reels in a housing F1 in the form of an endless loop.

Program tape F2 is light-impermeable and has light-permeable spots arranged along a predetermined number $n$ of longitudinal parallel tracks F41, F42 . . . F4$n$. Spots or perforations are also arranged in transverse rows spaced a predetermined distance from each other, and each transverse row includes a number of light-permeable spots. The number $n$ of tracks is the same as the number of knitting stations and pattern wheels M10 of which only one is shown in FIG. 1 for the sake of simplicity. It will be understood that a set of pattern wheels, for example 12 or 24 pattern wheels, are provided around the periphery of the needle cylinder Z. Each pattern wheel is associated with one of the tracks F41 to F4$n$ and is controlled in accordance with the program represented in the respective track by the presence or absence of a light-permeable spot.

A source of light F6 emits light which passes through a diaphragm having a gap F7, as schematically indicated in FIG. 1 so that the transverse rows of light-permeable spots are successively sensed by the beam of light of lamp F6. A set of photocells or photo diodes F51 to F5$n$ is located on the other side of the program tape and the several photocells F51, F52 etc. are excited when a beam of light passes through a light-permeable spot in the associated track F41, F42, etc., of the program tape. When no light-permeable spot is provided in the respective track, the respective photocell will not be excited. However, where the program tape causes light to fall into a photocell, the same produces a command signal in the form of an electric impulse.

The light-permeable marking F41 to F4$n$ and the width of the gap F7 are so designed that the respective photocell is illuminated and excited for a predetermined period of time corresponding to the speed of the knitting operations performed by the cylinder needles Z10.

Figures 6A, 6B:
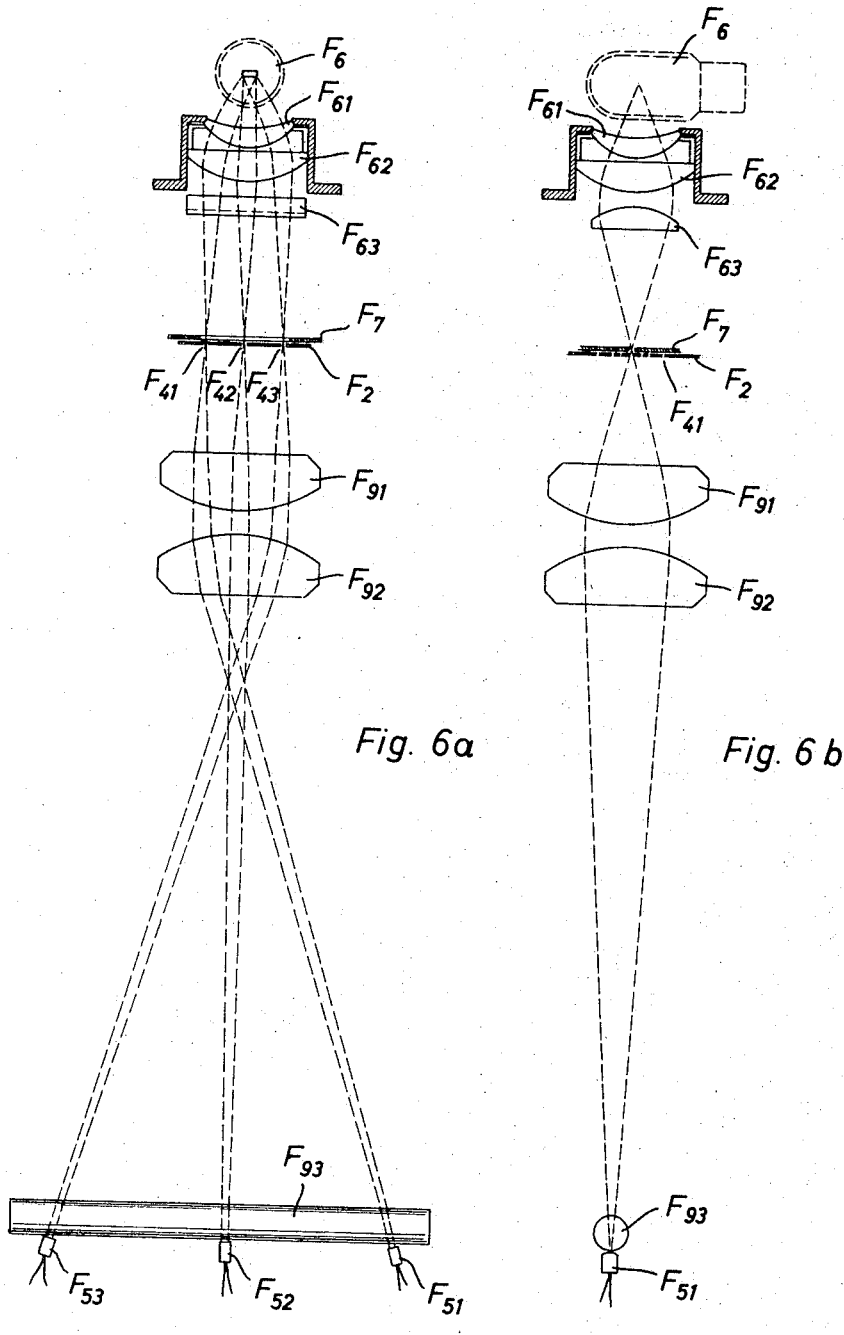
FIG. 6a is a front elevation.
FIG. 6b is a side elevation illustrating an optical system for reading out a program tape.

The illustration of the means by which the program tape is sensed is schematic, and FIGS. 6a and 6b show the arrangement in greater detail. The lamp F6 emits light toward a spherical condenser including two lenses F61 and F62 so that the light passes through a cylindrical lens F63 and in the form of a beam having a narrow cross section through the gap F7 of a diaphragm so that a transverse row of perforations F41, F42, F43, or other light-permeable areas, are passed by thin pencils of light which are directed by lenses F91 and F92 to form images of the light-permeable areas F41 to F43 on a collector lens F93 in the form of a glass rod of circular cross section behind which the photo diodes F51, F52, F53 are disposed. It will be understood that although only three photo diodes are illustrated, the number of photo diodes behind the glass rod F93 corresponds to the number of pattern wheels and tracks on the program tape F2 of which, for example twelve may be provided. The length of the gap F7 will be correspondingly greater.

The glass rod lens F93 has the effect that light passing through a light-permeable portion of the tape F2 is received by the photocells even if the light-permeable markings are not yet, or no longer at the center of the somewhat wider gap F7 while the program tape F2 is being transported in a continuous movement in synchronism with the rotary speed of the needle cylinder.

Figure 7B:
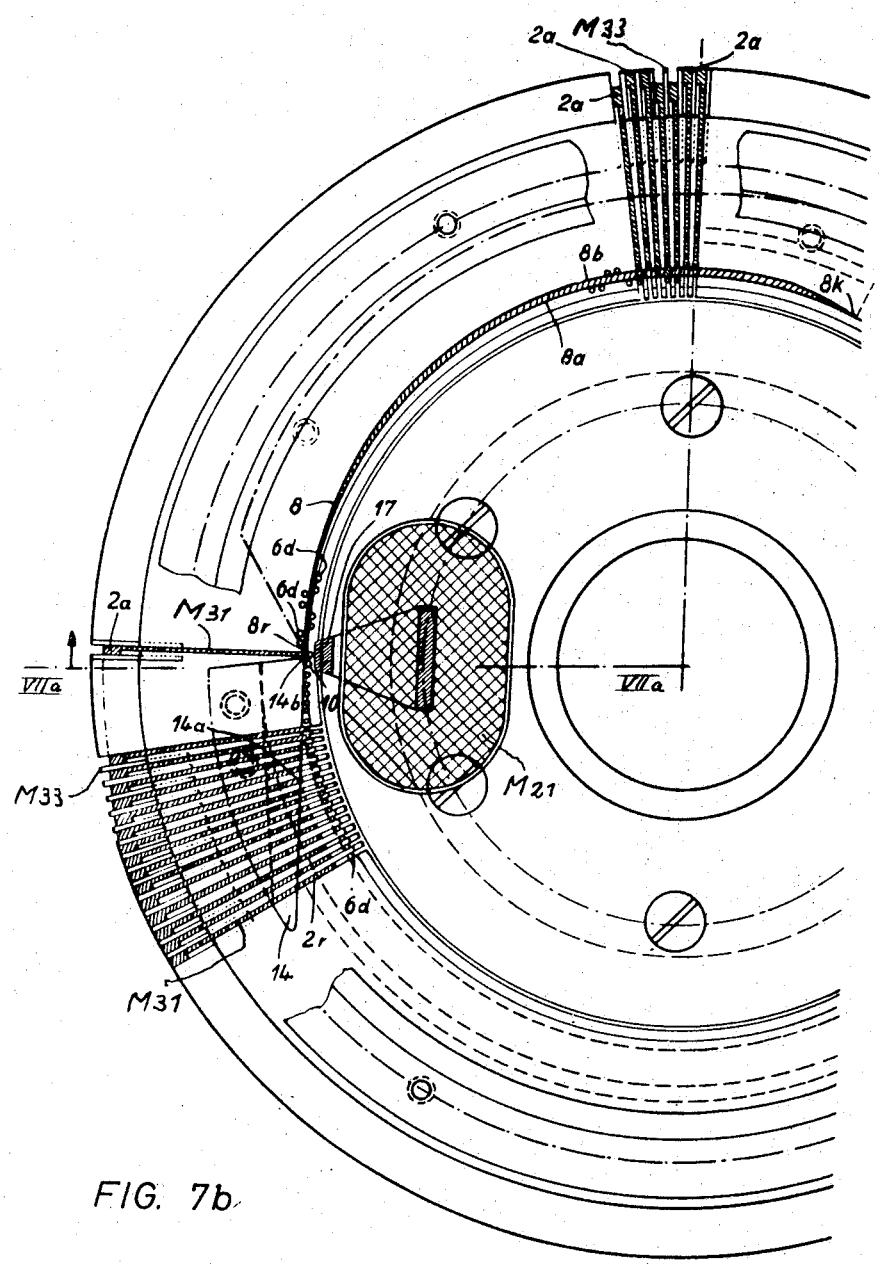

A plurality of pattern wheels is provided around the periphery of the needle cylinder Z, and one of the pattern wheels is illustrated in FIGS. 7a and 7b. The construction of this pattern wheel is not an object of the present invention, and a pattern wheel of this type is disclosed in the U.S. Patent 3,079,775 issued to J. A. Schaeder et al. on March 5, 1963. Particularly, FIGS. 9 and 10 of the pattern corresponds to FIGS. 7a and 7b of the present application.

Each pattern wheel has about the periphery thereof a set of radially projecting thin plates or teeth 1 which are in meshing engagement with the needles Z10 of the needle cylinder and projects into the spaces between the same so that each pattern wheel is rotated about a shaft 32 which is inclined to the vertical axis of the needle cylinder and projects into a bearing bore in a bushing 5a of the pattern wheel. Needle influencing jacks 2 are guided for radial movement in radial grooves in the floor portion 3 of the pattern wheel. Bushing 5a is secured to floor portion 3. The pattern wheel is closed on top by a cover M10 abutting a shoulder of bushing 5a and being pressed against the same through a spacing bushing 4b by a threaded ring 4a engaging a thread on the lower end of bushing 5a. An angular springy wire member 6 is located behind each jack M31. The springy members 6 have a horizontal arm 6a secured by a ring 7 which is held by screws on floor portion 3, and arms 6d which are normally in a position illustrated in broken lines in FIG. 7a extending at an angle greater than 90° to the corresponding arms 6a. The upper ends of arms 6d project beyond the jacks 2 into the region of cams 14 and 8 whose position is best seen in FIG. 7b, and which form with each other a gap 10 only slightly wider than the arm 6d of each springy member 6 so that arm 6d of each member 6 can pass through gap 10 which constitutes a selecting station. Cams 8 and 14 are secured to the underside of the stationary cover member M10, while the floor portion 3 of the pattern wheel rotates with springy members 6 so that the same successively arrive at the selecting station where gap 10 is located.

The springy legs 6d arrive during rotation of the pattern wheel first at cam 14 so that arms 6d are inwardly bent as shown in the left part of FIG. 7a. When a springy member arrives at gap 10 where cam 14 terminates at 14b, the tensioned arm 6d passes through the gap 10 across the end 8r of cam 8 and to a position located outside of the outer surface 8b of cam 8. During further rotation of the pattern wheel, the springy members 6 are transported beyond the end 8k of cam 8 and finally to cam 14 where legs 6d are pressed back. Only a small angular movement of leg 6d is required for engagement by the outside of cam 8. However, since the cam surface 8b rises in outward radial direction, the respective jack 2 which is located radially outward on the respective arm 6d is gradually advanced from the retracted position M31 to the needle influencing position M31 assumed at the operating station A.

The outer ends 2a of jacks 2 in the operative advanced position are located below the butts Z11 of the cylinder needles, and due to the inclined position of the pattern wheel, the cylinder needles cooperating with advanced jacks are raised as indicated at Z12 in FIG. 1, each jack 2 being located between two meshing projections 1 which engage opposite sides of the cylinder needle. A cam portion 15 engages the butts of the returning jacks 2 and retracts the jacks to the inoperative inner position before the same again arrive at the gap 10.

Inwardly of gap 10, an electric operating means in the form of an electromagnet M21 is mounted on the stationary cover M10 of the pattern wheel and has pole shoes 17 located adjacent gap 10 so that the springy legs 6d of members 6 can just pass between the pole shoes 17 and the gap. When electromagnet M21 is energized, in a manner which will be described hereinafter, the legs 6d are attracted and cannot resiliently move through gap 10. Consequently, the jacks 2 associated with the same remain in the inner inoperative position. However, when electromagnet M21 is not energized, the leg 6d of the respective springy member 6 arriving at gap 10 expands resiliently when passing beyond the edge 14b and is thereupon guided by the outer surface 8b of cam 8. The springy members which were attracted by the electromagnet, and more particularly the legs 6d thereof, are engaged by the inner surface 8a of cam 8 and move along the same while being held in the retracted inoperative position so that the associated jacks 2 remain also in the retracted inoperative position M31. The inner surface 8a permits a gradual movement of legs 6d to the outer position, which is fully assumed when the springy members pass beyond the end 8k of cam 8.

In accordance wtih the selection carried out by the electric operating means M21, some of the jacks will be in the advanced needle influencing position M31a, and other jacks will be in the retracted position M31 when arriving at the operating station A where advanced jacks cooperate with the butts of the cylinder needles, and retracted jacks do not engage the same.

Referring now to the diagram of FIG. 2, electromagnetic means M21, M22, M23 are shown, and it will be understood that M2n electromagnetic means are provided, the number n corresponding to the number of pattern wheels, knitting stations, and tracks on the program tape F2. Each electromagnetic means is connected by a capacitor C11, C12, C13 to the plates of a series of pentodes V21, V22, V23 to V2n which have two grids, one grid being connected to ground. The plate of each pentode is connected by resistors R21, R22, R23, R2n to a positive potential U2, another positive potential U1 being connected through an inductance or choke D11, D12, D13, D1n to the capacitors.

The other control grids of the pentodes are connected to the cathode of a triode V1 and to a resistor R12 which is connected to ground. The grid of triode V1 is connected to a resistor R11, and to the photocell S5 which receives light impulses from lamp S3 when openings S21 of the needle cylinder pass the light beam, as shown in FIG. 1. The number of openings or perforations S21 around the periphery of the needle cylinder corresponds to the number of needles. Positive voltage U3 is applied to the photo diode S5, and the negative voltage U5 is applied to resistor R11.

The control grids of the electron tubes V21, V22, V23, V2n are connected to resistors R31, R32, R33 which are connected to photo diodes F51, F52, F53, F5n which are also connected to the cathodes of the electron tubes V21, V22, V23, V2n. A negative voltage U4 is applied to resistors R31 to R3n.

The light-permeable areas F41 to F4n and the width of gap F7 are designed so that the photo diodes F51 to F5n are illuminated substantially during the entire time period alloted to the operation of a needle. Referring to the illustrated pattern wheel which has the electromagnetic operating means M21, the photo diode F51 will be illuminated during this time period in which a light-permeable marking F41 passes the photo diode F51. The photo diode F51 becomes conductive, and the negative control voltage U4 is substantially short-circuited by the resistor R31 so that the positive voltage U2 would cause an anode current to flow, which is prevented since the control grid bias of the electron tube V21 still has zero potential.

At some moment during the time period in which the respective photo diode F51 is illuminated and conductive, a perforation S21 passes the photo diode S5 so that the same receives an extremely short light impulse, which is much shorter than the light impulse received by photo diode F51. The current flowing through photo diode S5 compensates the negative blocking potential U5 so that the grid of the triode V1 receives a high potential causing a high potential of the cathode of triode V1 which is supplied as grid bias voltage to the electron tubes V21, V22, V23, V2n. In this condition, a current flows through electron tube V21 and capacitor C11 to the electromagnetic means M21. This current is opposed to the holding current continuously flowing through the coil of electromagnetic means M21, the holding current being caused by the positive voltage U1 which is connected by inductance D11 to electromagnetic means M21. Due to the compensation of the holding current, electromagnetic means M21 is deenergized, and cannot attract the respective leg 6d of a springy member 6 passing the gap 10 so that the respective leg 6d passes to the outer track 8b of cam 8 and causes the advance of a jack 2 to the needle influencing position M31a. If the respective photo diode F51 to F5n does not receive light due to the fact that no light-permeable marking was provided at the respecive track of the tape F2, the illumination of photo diode S5 will have no influence on the respective electromagnetic means of the respective pattern wheel, and the respective electromagnetic means will attract the respective leg 6d so that the respective jack 2 remains in the retracted inoperative position M31.

While the anode current of an energized electromagnetic means M21 to M2n flows and deenergizes the same, a capacitor C11 to C1n discharges. The discharge capacitor is again charged by voltage U2 through one of the resistors R21 to R2n.

From the above explanation of the circuit of FIG. 2 in accordance with the present invention, it will be understood that any jack of any pattern wheel can only be advanced to a needle influencing position, when a synchronizing impulse is provided by triode V1 when the photo diode S5 receives a short light impulse. Of course, the control grid of the respective pentode must also be on zero potential which is effected by the photo diode F51 to F5n in accordance with the program marked on the program tape F2. The synchronizing circuit including the triode V1 and resistors R11 and R12 is controlled by the impulse generator S3, S21, S5 which is actuated by a movable machine element, shown in the embodiment of FIG. 1 to be the needle cylinder Z on which the perforations S21 are provided. As will be explained hereinafter with reference to FIGS. 3, 3a, 4 and 5, other machine elements, for example the pattern wheel, may be used for controlling the impulse generator, as long as the frequency of the synchronizing impulses produced by the impulse generator is proportionate to the speed of the needle cylinder and of the pattern wheels which are connected to each other for synchronous turning movement by projections 1 of the pattern wheels meshing with the needles of the needle cylinder. The electromagnetic means M21 to M2n are mounted on the pattern wheels in such a position in relation to the meshing projections 1 that whenever an opening S21 passes the photo diode S5, a springy member 6 is aligned with the pole shoes 17 of the respective electromagnetic means M21 to M2n. In this manner it is assured that the synchronizing impulse produced by the impulse generator under control of photo diode S5, will arrive at the proper time for actuating electromagnetic means M21 to M2n even if program tape F2 is not in the theoretically exact position. A precise synchronization of program tape F2 with the needle cylinder and pattern wheel is not possible due to the play within transmission F81 to F87, and the play of the teeth of sprocket F81 in the perforations F3 of the program tape with its markings. Due to the synchronizing circuit, a lag of up to half the available time period is permissible since the synchronizing impulses which are produced by the impulse generator at precisely spaced time periods without any mechanical delay control the moment of actuation of the electromagnetic means M21 to M2n.

As noted above, the projections 1 of the pattern wheels are in precise meshing engagement with the needle butts Z11 of the cylinder needles Z10, which remain in the lower inoperative position Z13 when the respective jack 2 remains retracted in the position M31 and which assume the higher operative position Z12 when the respective jack has been advanced by the respective springy member 6 when the respective electromagnetic means M21 was deenergized due to the fact that a light impulse was received by the corresponding photo diode F51 to F5n.

In the embodiment of FIG. 1, the perforations S21 in the needle cylinder are associated with the cylinder needles Z10, and provide as many light impulses to photo diode S5 as there are cylinder needles.

Figure 3A:
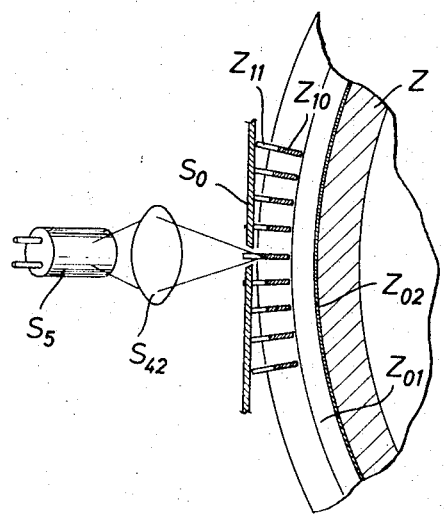
FIG. 3a is a fragmentary cross-sectional view of a portion of a needle cylinder of a second embodiment in which the photo-electric sensing means are modified.

In the modified embodiment illustrated in FIGS. 3 and 3a, the cylinder needles Z10 are sensed by photoelectric sensing means. A lamp S3 illuminates through a lens S41 and a narrow gap provided in a diaphragm S0 the cylinder needles Z10 passing the gap. Each needle behind the gap reflects light through a lens S42 into the photo diode S5 so that the same is energized and becomes conductive with the effect explained with reference to FIG. 2. The surface of the needle cylinder behind the needles Z10 is covered with a layer of a dark lacquer Z02 and the corresponding annular area of the needle cylinder is provided with a recess Z01 so that no light is reflected into the photo diode S5 when a space between two cylinder needles Z10 is sensed by the light beam of lamp F3.

Since it is the object of the invention to achieve a very precise timing of the operation of springy members 6 by the electromagnetic means, the best solution would be to sense the position of the springy members in the pattern wheel by photoelectric sensing means, but this is not practical due to the very compact construction of the pattern wheels and the little space available in the same. Since practically no play exists between the projections 1 of the pattern wheels and the cylinder needles Z10 with which projections 1 mesh, the control of the impulse generator by the needle cylinder is sufficiently accurate, but in the embodiment of FIG. 4 the pattern wheel controls the impulse generator which eliminates any source of error which may be caused by play between the pattern wheel and the needle cylinder. The pattern wheel of FIG. 4 is shown to have a fixed cover M10 and projecting teeth 2 and the construction of this pattern wheel corresponds in every respect to the construction of the pattern wheel illustrated in FIG. 7b, the only addition being a downwardly depending flange on the rotary floor portion 3 of the pattern wheel provided with a circular row of perforations S22. A photo diode S5 is stationarily mounted inwardly of the perforated flange and receives light impulses from a lamp S3 through perforations S22 and a diaphragm S0 provided with a narrow gap. It is evident that during rotation of a pattern wheel, synchronizing impulses will be produced by the impulse generator S3, S22, S5. The number of perforations S22 is the same as the number of springy members 6 and of jacks 2 and a very precise synchronization can be obtained. It is sufficient to provide only one of the pattern wheels with the impulse generator, and in this event, the electric circuit shown in FIG. 2 is used without any change. However, in a modified embodiment each of the pattern wheels is provided with an impulse generator as shown in FIG. 4, and the synchronizing impulses produced by the impulse generator of each pattern wheel, are used for controlling only the electromagnetic means of the respective pattern wheel. In this modified embodiment, the electric circuit is simplified as compared with FIG. 2. The circuit parts associated with the electromagnetic means M22, M23 to M2n are omitted, and a circuit including the impulse generator S5, V1, R11, R12 and the circuit of the respective electromagnetic means M21 including inductance V11, capacitor C11, resistor R21, pentodes 21, photo diode F21, and resistor R31 are provided for each pattern wheel. Another modified embodiment of the invention is illustrated in FIG. 5. The ring gear Z2 of the needle cylinder meshes with a special pinion which is composed of two gears F871 and F872 which are urged to turn in opposite directions by springs F873 in corresponding cutouts. Due to this known arrangement, no play exists between the teeth of the needle cylinder and the teeth of the composite pinion. It will be understood that the same composite gear can be used instead of gear F87 in the embodiment of FIG. 1. Shaft F86 is driven by the composite pinion and carries a toothed pulley F85 driving a toothed belt F84 by which the program tape is transported, as illustrated in FIG. 1. At the lower end of shaft F86, a circular disk S1 is fixed which is provided with a circular row of perforations S2. A lamp S3 illuminates the perforations S2 through a lens S4 so that the photo diode S5 is excited whenever a perforation S2 passes the beam of light.

In the embodiment of FIG. 5, the number of perforations on disc S1 is smaller than the number of cylinder needles Z10 and of jacks 2. However, the shaft F86 rotates at a higher rotary speed than the needle cylinder, and the transmission ratio is selected so that the number of light impulses received by photo diode S5 during a single revolution of the needle cylinder and several revolutions of the composite pinion, is the same as the number of cylinder needles Z10 and of jacks 2 in each pattern wheel. The electric circuit of FIG. 2 is used in the embodiment of FIG. 5 without any change.

It is also possible, if space does not permit any other arrangement, to provide the perforated disc on shaft F82, but in this event, play in the transmission F82 to F87 must be completely eliminated as explained with reference to the composite pinion.

The impulse generators described in the present application produce synchronizing impulses under the control of light impulses. It is contemplated, however, to use impulse generators controlled by a movable machine element, such as the needle cylinder or the pattern wheel, in a different manner to produce synchronizing impulses at a frequency corresponding to the speed of the needle operations.

When the machine is operated, the needle cylinder and the pattern wheels rotate, and the program tape F2 is transported at a speed proportionate to the peripheral speed of the needle cylinder and of the pattern wheels meshing therewith.

The several tracks of the program tape, which are respectively associated with different pattern wheels, are sensed by the photoelectric sensing means F6 and F51 to F5n, and whenever the respective photo diode receives an impulse in accordance with the light-permeable area on the program tape, the respective circuit is prepared to cause deenergization of the respective electromagnetic means, the deenergization taking actually place when a synchronizing impulse is produced by the impulse generator under the control of the photo diode S5, irrespective in which rotary machine element the perforations S21, or S22, or S2 are provided.

Regardless of the incomplete synchronization of the program tape with the needle cylinder and the pattern wheel caused by the play of the transmission driving the program tape, the electromagnetic means of the pattern wheels control the jacks at exactly the right moment since the synchronizing impulses produced by the impulse generator are precisely synchronized with the rotation of the needle cylinder and of the pattern wheels.

It will be understood that each of the elements described above, or two or more together, may also find a useful application in other types of knitting machines differing from the types described above.

While the invention has been illustrated and described as embodied in a circular knitting machine provided with electric operating means controlling the pattern knitted by the machine and being actuated under the control of precisely timed synchronizing impulses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a knitting machine, in combination, a movable machine element driven to cause knitting operations; a pattern controlling element including a plurality of individually operable pattern influencing members, and electric operating means operable for individually actuating said pattern influencing members, said pattern controlling element being connected with said machine element for synchronous movement; program controlled means operatively connected with one of said elements for synchronous movement and being operatively connected with said electric operating means, said program controlled means being selectively placed for program determined time periods in an operative condition in accordance with a program; impulse generator means controlled by one of said elements to produce electrical synchronizing impulses at a frequency proportionate to the speed of said elements; and electric synchronizing means controlled by said impulses of said impulse generator means and connected with said program controlled means to cause actuation of said electric operating means for predetermined short time periods in rigid synchronism with said synchronizing impulses and with the speed of said pattern controlling element for causing selective actuation of said pattern influencing members.

2. A knitting machine according to claim 1, wherein said impulse generator means includes photoelectric sensing means.

3. A knitting machine according to claim 1, wherein said impulse generator means include a movable member having uniformly spaced light controlling areas, and being driven by one of said elements, a source of light, and a photocell disposed to receive light impulses when said light controlling areas pass said source of light and said photocell so as to produce electrical synchronizing impulses at a frequency proportionate to the speed of said element.

4. In a knitting machine, in combination, a movable machine element driven to cause knitting operations; a pattern controlling element including a plurality of individually operable pattern influencing members, and electric operating means operable for individually actuating said pattern influencing members, said pattern controlling element being connected with said machine element for synchronous movement; program controlled means operatively connected with said machine element for synchronous movement and including electric actuating means operatively connected with said electric operating means and being selectively placed for program determined time periods in an operative condition in accordance with a program; impulse generator means controlled by one of said elements to produce electrical synchronizing impulses at a frequency proportionate to the speed of said elements; and electric synchronizing means controlled by said impulses of said impulse generator means and connected with said actuating means to actuate only program selected actuating means in said operative condition for predetermined short time periods in rigid synchronism with said synchronizing impulses and with the speed of said pattern controlling element for causing selective actuation of said pattern influencing members.

5. A knitting machine according to claim 4 wherein said impulse generator means include a rotary member having uniformly spaced light controlling areas and being driven by one of said elements, a source of light, and a photocell disposed to receive light impulses when said light controlling areas pass said source of light and said photocell so as to produce electrical synchronizing impulses at a frequency proportionate to the speed of said elements.

6. A knitting machine according to claim 4 wherein said impulse generator means include a rotary perforated member driven by one of said elements, a source of light, and a photocell disposed to receive light impulses through said perforated member to produce electrical synchronizing impulses at a frequency proportionate to the speed of said elements.

7. A knitting machine according to claim 4 wherein said electric actuating means includes a pentode electrically connected with said electric operating means and having a control grid; and wherein said electric synchronizing means include an electronic tube having a grid receiving said impulses of said generator means, and being electrically connected with said control grid of said pentode to render the same conductive only when said pentode is in said operative condition.

8. A knitting machine according to claim 7 wherein said impulse generator means includes photoelectric sensing means.

9. A knitting machine according to claim 4 wherein said program controlled means includes transporting means operatively connected with said machine element for synchronous movement and adapted to transport a program tape having light-permeable portions for representing information regarding a desired knitting pattern, a source of light, light responsive means opposite said source for producing electric impulses in accordance with said information when receiving light impulses through said light-permeable portions from said source of light, and wherein said electric actuating means are controlled by said electric impulses.

10. A knitting machine according to claim 4 wherein said machine element includes a rotary needle cylinder; wherein said pattern influencing members of said pattern controlling element are jacks; wherein said actuating means include electric circuit means; wherein said impulse generator means includes photoelectric sensing means for sensing one of said elements to produce electrical synchronizing impulses at a frequency proportionate to the rotary speed of said elements; and wherein said electric synchronizing means is connected with said actuating circuit means to actuate for short time periods said actuating circuit means in said operative condition in rigid synchronism with said synchronizing impulses and with the rotary speed of said pattern controlling element so that said electric operating means are operated to cause selective actuation of said jacks.

11. A knitting machine according to claim 9 wherein said pattern controlling element includes a plurality of pattern wheels, said pattern wheels being connected with said needle cylinder for synchronous rotary movement; and wherein said photoelectric sensing means of said impulse generator means cooperate with said needle cylinder for sensing the angular position of the same so as to produce electrical synchronizing impulses at a frequency proportionate to the rotary speed of said needle cylinder.

12. A knitting machine according to claim 11 wherein said impulse generator means includes a rotary perforated member rotating in synchronism with said needle cylinder, a source of light, and a photo diode disposed to receive light impuses through said perforated member to produce electrical synchronizing impulses.

13. A knitting machine according to claim 12 wherein said program controlled means include transporting means operatively connected with said needle cylinder for synchronous movement and adapted to transport a program tape having light-permeable portions for representing information regarding a desired knitting pattern, a source of light, a photocell opposite said source of light for producing impulses when receiving light through said light-permeable portions from said source.

14. A knitting machine according to claim 13 wherein said electric actuating circuit means include a pentode having an anode, control grids, and a cathode, a capacitor connecting said anode with said electric operating means, said cathode being connected with said photocell so that said pentode is selectively placed in an operative condition in accordance with a program; and wherein said electric sychronizing means include a triode having a cathode connected to one of said control grids, and a grid connected with said photo diode so as to be controlled by said impulses of said impulse generator means and to render said pentode conductive for short time periods only when said pentode is in said operative condition.

15. A knitting machine according to claim 12 wherein said rotary perforated member of said impulse generator means is connected to at least one of said pattern wheels for rotation therewith.

16. A knitting machine according to claim 10 wherein said rotary needle cylinder has needles spaced about the circumference thereof; and wherein said impulse generator means include a source of light for illuminating said needles of said needle cylinder whereby light is reflected, and a photocell disposed to receive reflected light impulses from each of said cylinder needles to produce electric synchronizing impulses.

17. A knitting machine according to claim 16 wherein said needle cylinder has an annular peripheral recess inwardly of said needles, and a layer of a dark material covering said recess, said recess being located in the region of said needles illuminated by said source of light so that no light is reflected by portions of said needle cylinders located between said needles.

18. A knitting machine according to claim 10 wherein said impulse generator means include a transmission driven by said needle cylinder and having an output shaft, a rotary perforated member fixed on said output shaft and rotating at a higher rotary speed than said needle cylinder, said perforated member having a circle of perforations whose number multiplied by the transmission ratio equals the number of needles of said needle cylinder, a source of light illuminating said perforation, and a photocell disposed to receive light impulses through said perforations to produce said electrical synchronizing impulses.

19. A knitting machine according to claim 10 wherein said pattern controlling element includes a plurality of pattern wheels, each pattern wheel having a plurality of individually operable pattern influencing jacks and an electric operating means for individually causing actuation of the respective jacks, said pattern wheels being connected with said needle cylinder for synchronous rotary movement; wherein each pattern wheel includes a plurality of movable actuating members respectively located inwardly of each jack and resiliently biased to move from a normal inoperative position in outward direction to an operative position for actuating the correlated jack to move to an advanced needle influencing position; and wherein said electric operating means is a stationary electromagnet normally energized to hold actuating members passing the same during rotation of the respective pattern wheel in said inoperative position, and being de-energized by said electric actuating circuit means to permit movement of the respective actuating member to said operative position whereby the respective jack is moved to said needle influencing position.

20. A knitting machine according to claim 19 wherein said program controlled means includes transporting means operatively connected with said needle cylinder for synchronous movement and adapted to transport a program tape, sensing means for sensing information recorded on said program tape and producing corresponding electric impulses representing information; wherein said electric actuating circuit means include a pentode having an anode, control grid, and a cathode, a capacitor connecting said anode with said electric operating means, said cathode being connected with said sensing means so that said pentode is selectively placed in an operative condition in accordance with a program; and wherein said electric synchronizing means include a triode having a cathode connected to one of said control grids, and the grid connected with said photo diode so as to be controlled by said impulses of said sensing means and to render said pentode conductive for short time periods only when said pentode is in said operative condition.

References Cited by the Examiner
UNITED STATES PATENTS 3,079,775   3/1963   Schaeder et al. _____ 66—50

FOREIGN PATENTS 1,185,253   2/1959   France.

MERVIN STEIN, *Primary Examiner.*

DONALD W. PARKER, *Examiner.*

R. FELDBAUM, *Assistant Examiner.*